(12) United States Patent
Von Mohos

(10) Patent No.: US 8,096,323 B2
(45) Date of Patent: Jan. 17, 2012

(54) DEVICE FOR RECEIVING LIQUIDS IN AIRCRAFT AND/OR RELEASING LIQUIDS THEREFROM

(76) Inventor: Zoltan Von Mohos, Pulheim (DE)

( * ) Notice: Subject to any disclaimer, the term of this patent is extended or adjusted under 35 U.S.C. 154(b) by 494 days.

(21) Appl. No.: 11/573,228

(22) PCT Filed: Aug. 12, 2005

(86) PCT No.: PCT/EP2005/008790
§ 371 (c)(1),
(2), (4) Date: Feb. 5, 2007

(87) PCT Pub. No.: WO2006/024383
PCT Pub. Date: Mar. 9, 2006

(65) Prior Publication Data
US 2008/0029646 A1    Feb. 7, 2008

(30) Foreign Application Priority Data

Aug. 28, 2004  (DE) .......................... 10 2004 041 774

(51) Int. Cl.
*B64D 1/16* (2006.01)
(52) U.S. Cl. ..................... 137/899.2; 137/266; 137/576; 244/136
(58) Field of Classification Search ............... 137/899.2, 137/255, 263, 264, 266, 267, 571, 572, 574, 137/576; 244/117 R, 129.1, 136
See application file for complete search history.

(56) References Cited

U.S. PATENT DOCUMENTS

| 2,966,921 | A | * | 1/1961 | Whiteman | ..................... | 137/122 |
| 3,220,482 | A | * | 11/1965 | Eveleth | ........................... | 169/47 |
| 3,494,423 | A | * | 2/1970 | Stansbury et al. | ............... | 169/43 |
| 3,698,480 | A | | 10/1972 | Newton | | |
| 3,714,987 | A | * | 2/1973 | Mattson | .......................... | 169/47 |
| 3,754,601 | A | | 8/1973 | Linkewich | | |
| 3,897,829 | A | | 8/1975 | Eason et al. | | |
| 4,979,571 | A | * | 12/1990 | MacDonald | .................... | 169/44 |
| 5,135,055 | A | * | 8/1992 | Bisson | ............................ | 169/53 |
| 5,549,259 | A | * | 8/1996 | Herlik | ........................... | 244/136 |
| 5,904,165 | A | * | 5/1999 | McLean et al. | ............... | 134/172 |
| 6,209,593 | B1 | * | 4/2001 | Nichols, Sr. | .................. | 141/231 |
| 2001/0054669 | A1 | * | 12/2001 | Ramage et al. | ............... | 244/136 |

FOREIGN PATENT DOCUMENTS

FR    1481100 A    5/1967
GB    2348383 A    10/2000

(Continued)

*Primary Examiner* — Stephen M Hepperle
*Assistant Examiner* — Kevin Murphy
(74) *Attorney, Agent, or Firm* — Gifford, Krass, Sprinkle, Anderson & Citkowski, P.C.

(57) ABSTRACT

The invention relates to a device (1) for receiving liquids in an aircraft and/or releasing liquids therefrom, especially during the flight, said device being arranged especially in an airplane. The aim of the invention is to provide a device which can receive large quantities of liquids in a rapid, reliable and flexible manner. To this end, said device comprises a tank module (2) provided with at least one tank container (6) that is connected to a collector (8) by means of at least one connecting shaft (7), a bulkhead module (3) that can be connected to the tank module by means of the collecting tank and comprises a closing element (9) by which means, in the open position, liquids are released from the tank module, a refueling module (4) which is connected to the tank module by means of at least one supply line (10), and a tube which is arranged on a winding device (11) and comprises a receiving element (13) provided with at least one opening (14) which receives liquids released from the aircraft, so that the refueling of the device can take place.

21 Claims, 6 Drawing Sheets

FOREIGN PATENT DOCUMENTS

Figure 1:
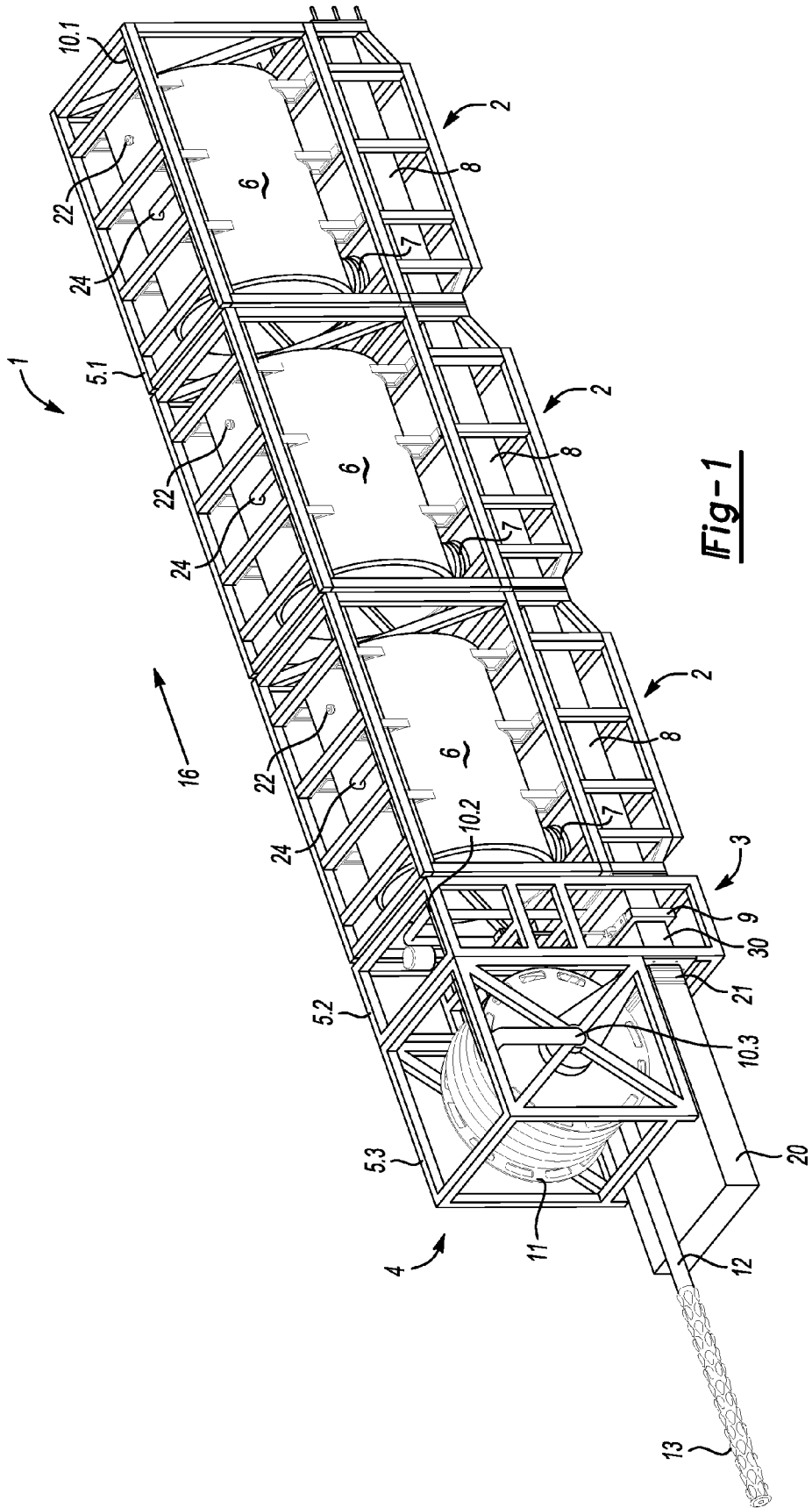

| | | |
|---|---|---|
| GB | 2348383 A | 10/2000 |
| RU | 2097276 C1 | 11/1997 |
| RU | 2101216 C1 | 1/1998 |
| WO | 94/28975 A | 12/1994 |
| WO | 01/69058 A | 9/2001 |
| WO | WO-01/69058 A2 | 9/2001 |

* cited by examiner

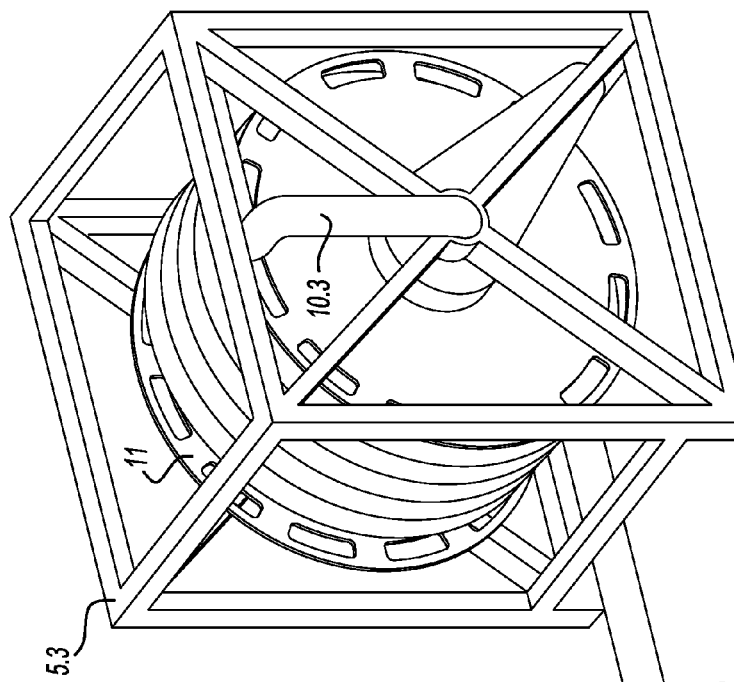
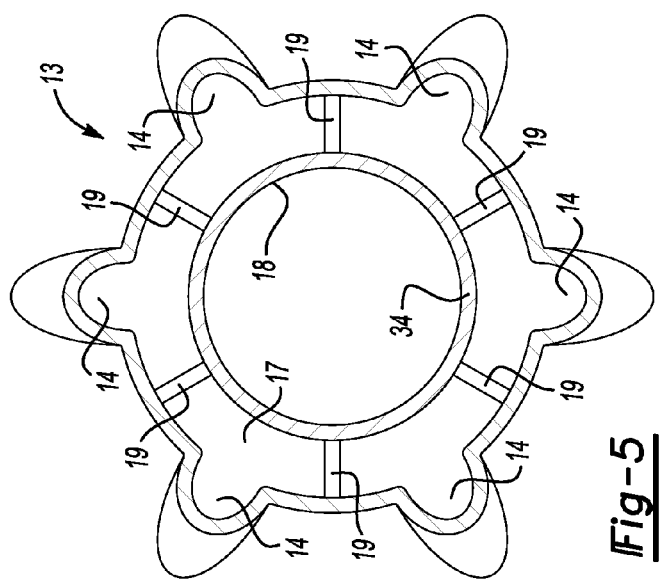
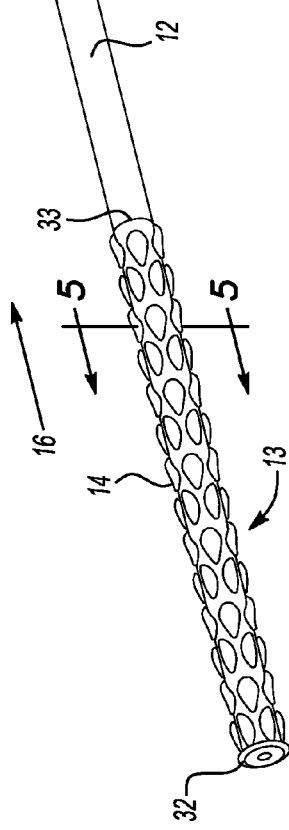
Fig-4
Fig-5

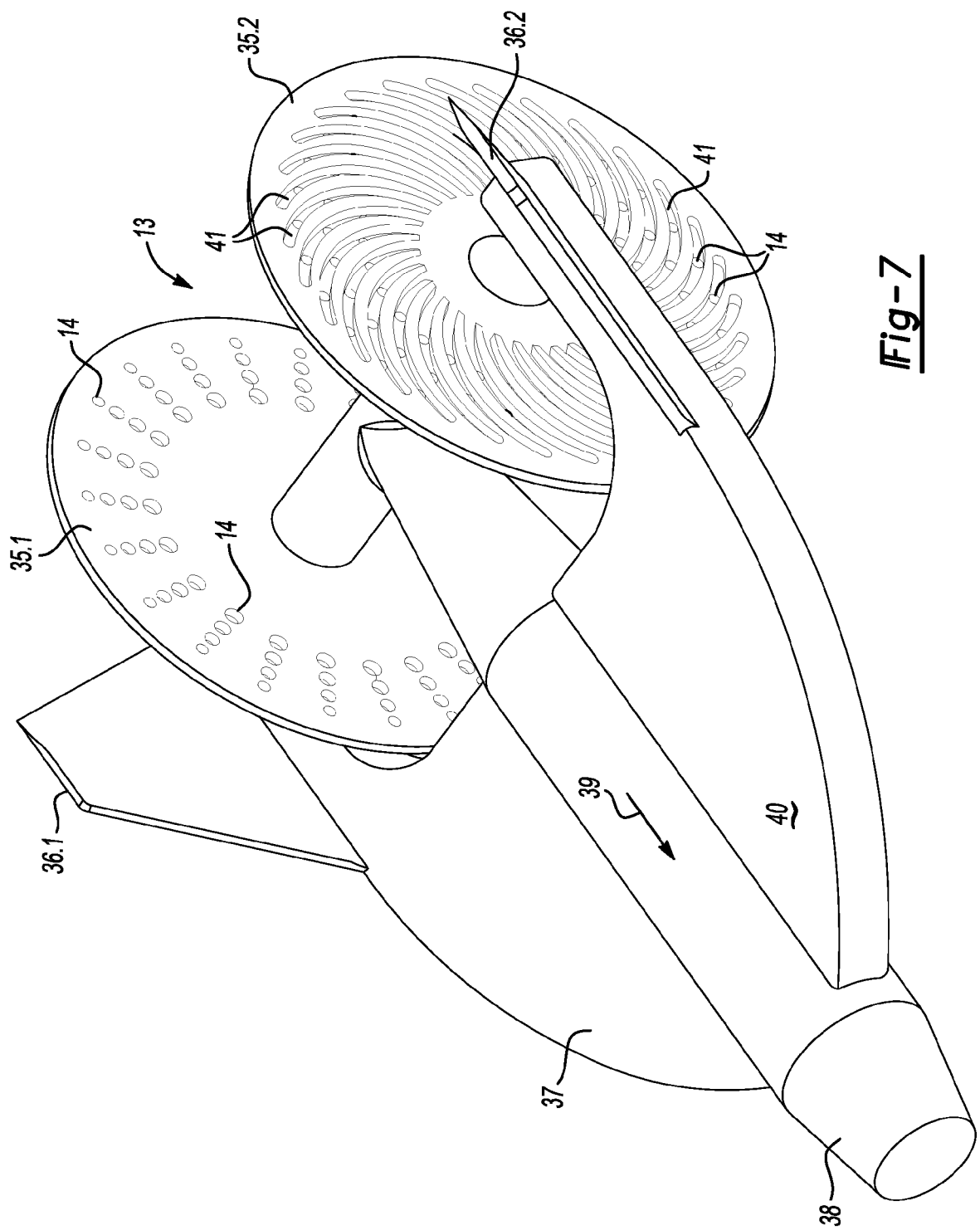

DEVICE FOR RECEIVING LIQUIDS IN AIRCRAFT AND/OR RELEASING LIQUIDS THEREFROM

The present invention relates to a device for receiving liquids in an aircraft and/or releasing liquids therefrom, in particular whilst in flight, said device being arranged especially in an airplane.

Receiving large amounts of liquids is the prerequisite for a useful deployment of aircraft, in particular airplanes, for example when extinguishing fires, irrigating fields, fertilizing or applying pesticides as well as applying de-icing products. For these purposes it is particularly desirable not only to receive the largest possible amounts of appropriate liquids, but also to perform filling of the tanks required for this purpose at the highest possible speed without having to resort to complex measures.

From DE 39 05 118 A1 a device for the transport of fire extinguishing agents is known, which may be arranged on a transport vehicle, for example chain-driven vehicles, trucks, helicopters or ships. The device there disclosed represents an autonomous fire extinguishing system, which may be transported to the source of the fire by conventional means of transportation. The device comprises a tank, of containerized construction, including a plurality of chambers, subdivided by at least one longitudinal and one horizontal bulkhead for receiving the fire extinguishing agents, for example water, as well as an engine room adjoining an end face of the container for receiving the fire extinguishing equipment, and a plurality of closable connector nipples projecting through the exterior container walls as well as at least one aperture for charging and withdrawing the fire extinguishing agent. The device disclosed in DE 39 05 118 A1 is moved to a water supply location by a transport vehicle, the container being filled there by a fire extinction suction pump, for example. The fire extinguishing agent received is then transported to the site of the fire and released again by appropriate fire extinguishing devices. A particular disadvantage of the device known from DE 39 05 118 A1 is that the latter, on the one hand, does not permit high speed filling, and no discharge of the device at high velocity, exclusively by atmospheric pressure, on the other hand, is possible; the device is further constructed in a relatively complex manner so that it exhibits only limited flexibility with regard to the amount of water to be received for fire extinguishing purposes.

It is thus the object of the present invention to provide a device, which, on the one hand, is adapted in a flexible manner to the respective circumstances, and which, on the other hand, also permits rapid filling of the said device.

This object is attained by proposing a device for receiving liquids in an aircraft and/or releasing liquids therefrom, in particular whilst in flight, said device being arranged in an aircraft,
- including a tank module including at least one tank container, connected to a collecting tank via at least one connecting shaft;
- including a bulkhead module which is adapted to be connected to the tank module via the collecting tank, including a closing element by means of which, in the open position, liquids are released from the tank module; and
- including a filling module which is connected to the tank module via at least one feeding line, and a hose pipe which is arranged on a coiling device, comprising a receiving element provided with at least one aperture, receiving liquids released from the aircraft, so that filling of the device may be performed.

As a result of the modular design of the device according to the invention, it is possible to react to the existing quantities of liquid in a very flexible manner by simply interconnecting a plurality of tank modules. In addition, due to the specific construction of the filling module and the preferably at least double-walled receiving element arranged thereon, large quantities of water may be received simply and reliably, for example when flying over a body of water. Filling of the device according to the invention may, however, also be performed in a stationary mode, i.e. while the aircraft is on the ground.

Preferred liquids to be received in the device according to the invention are water for fire fighting, possibly with added fire-retarding or fire-reducing substances, irrigation water, liquid food, fertilizers, de-icing agents, pesticides and/or other plant protection agents. The addition of the latter may be effected via a feeding point in the bulkhead module, arranged e.g. behind the bulkhead, viewed in the direction of flight.

The device according to the invention permits in a cost-effective manner to receive variable quantities of liquids and to release them again rapidly. The connection of the individual modules, in particular also of a plurality of tank modules via a collecting shaft, ensures a fast assembly of the device according to the invention with regard to the desired quantities of liquid to be received. In this context, the individual modules, in particular the tank modules, may not only be arranged one behind the other, but, alternatively, it is also possible to bring about connections to parallel disposed tank modules by means of cross-connecting elements arranged on the collecting tank and/or tank container, preferably the collecting tank. This permits to form a large cross-linked array of tank modules, the latter requiring merely a single bulkhead module and a filling module as well as a discharge device. In such a cross-linked array of the device according to the invention, it is, however, also possible to provide a plurality of bulkhead and/or filling modules and discharge modules in order to attain further accelerated filling or discharge of the device according to the invention. The collecting tank interconnecting the tank modules and/or connecting the tank module to a bulkhead module, may, for example, comprise flanges as connecting means, including loose or fixed seals, in addition, preferably provided with plugging elements, so that a reliable connection of the individual modules is ensured at all times. The last module of each row of tank modules, arranged one behind the other, will then simply include a single closing element, which is fitted to the flange of the last tank module. The connections between the collecting shafts of tank modules arranged parallel side-by-side may in this case be brought about in the same manner by flanges—however, in this case it may, in particular, also be provided to fit a ball valve or the like.

In a preferred embodiment the at least one aperture is provided in an exterior wall of the receiving element, preferably designed as an incision, which is raised so as to face in the direction of flight. In this context, it is particularly advantageous if the incisions are realized in the shape of a V, since this permits simple raising of the relevant parts of the receiving element to form an at least adequately large aperture. "To raise" in the sense of the present invention means that the relevant parts of the receiving element formed by incisions are raised above the outer surface of the receiving element. By raising the at least one aperture formed by the incisions to face in the direction of flight, for example while receiving fire fighting water by means of an aircraft flying across a lake or the sea, water is received by the receiving element and is subsequently fed to the tank modules of the device according to the invention.

The receiving element may be designed, in particular, in an aerodynamically and/or hydronautically optimized form. In an alternative embodiment, it may be provided with its own drive means, which would then preferably permit to synchronize the velocity of the aircraft and the receiving element.

Most preferably, the filling module or the bulkhead module comprises a pumping device, by which liquid received in the region between the exterior and the first, at least one interior wall of the receiving element is pumped into the tank module through a central, internal pumping line of the receiving element as well as through the hose pipe, the pumping line forming the interior wall of the receiving element. In this context, the pumping device may, for example, be designed as a suction pump, and may be integrated into the coiling device of the filling module in a space-saving manner in the interior thereof or it may be integrated in the bulkhead module in a readily accessible manner. The bulkhead module, but also the filling module may further include a generator or the like for an autonomous energy supply.

The at least double-walled structure of the receiving element reduces turbulences in the liquid received, lowering its flow velocity. In a preferred embodiment, both the exterior wall as well as also the interior wall, in the case of a double-walled design of the receiving element, or the plurality of interior walls, comprise apertures, for example V-shaped incisions. As a result, liquid flows from the outside to the inside of the receiving element and may be pumped into the tank module by means of the central internal line, also called pumping line. Due to the perforation of the walls, the turbulences as well as the flow velocities of the liquid received are reduced so that pumping may be performed very efficiently. The internal line (pumping line) is in this case preferably closed at its end opposite the filling module/hose pipe.

Alternatively, the end of the receiving element opposite the hose pipe is provided with a sealing means, which is arranged in such a manner that the quantity of liquid, having reached the region between an exterior wall of the receiving element, provided with at least one aperture, and the at least one further interior wall or pumping line of the receiving element, preferably not provided with incisions, collects in the head region, i.e. at the end of the receiving element opposite the hose pipe, being transported from there to the tank modules of the device according to the invention via the internal line, which may be formed by the hose pipe itself. In the head region of the receiving element the exterior wall is, therefore, longer than the pumping line situated inside.

It is an advantage of such a design of the receiving element that the water collecting in the head region of the receiving element is less turbulent than the water flowing into the receiving element through the at least one aperture, so that the pump is pumping the liquid into the tank module(s) much more efficiently.

In such a filling process of the device according to the invention, preferably one or a plurality of fins may be arranged on the outer surface of the receiving element for stabilizing purposes, more preferably, the said receiving element may be weighted by having weights fitted. Finally, as a further auxiliary device, a steel rope may pass parallel to the receiving element and also to the hose pipe, absorbing the tensile stress from the receiving element during airborne-water-filling, transferring the latter to the modules of the device according to the invention, arranged preferably in a frame structure, if a connection of the steel rope to the frame structure is brought about.

The modules may, in principle, be manufactured, in particular, of composite materials.

Alternatively, it may also be provided to fit a pumping device at the top end, i.e. at the end of the receiving element itself, opposite the hose pipe, in which case a suction pumping device, arranged, in particular, in the filling module, could then be dispensed with. Such a design of the receiving element is advantageous in particular, if the device according to the invention is filled in stationary mode.

A further, alternative embodiment may provide that a single-walled, tubular receiving element is connected to the hose pipe via a bayonet fitting, for example, and that after introducing the latter into a liquid by means of a pumping device, for example, arranged in the filling module or a pump disposed in the head region of the receiving element, the liquid is pumped into the tank modules of the device according to the invention.

In a further, alternative embodiment, the receiving element may be so designed that it includes at least one rotation body. The rotation body may in this context be designed as a disk wheel. The rotation body is preferably at least double-walled and is provided on both sides with a plurality of apertures through which liquid may be received. The liquid is received through the apertures and is passed into the hose pipe via a connecting element. In a particularly preferred embodiment, the receiving element comprises in this context at least two rotation bodies. For stabilizing purposes, the receiving element may in this case additionally comprise at least one or a plurality of fins. Furthermore, the base body, supporting the rotation bodies, may be designed, just like the latter, in an aerodynamically and/or hydronautically optimized manner.

At the end of the receiving element opposite the hose pipe or the filling module, a stabilizing element or a dragging body may optionally be provided, in particular coupled thereto. This damps the impact of the receiving element on the water surface, in particular in the event of filling in flight; skipping on the water surface is prevented. In addition, depending on the design of the stabilizing element (weighting), the immersion depth of the receiving element may be influenced.

Preferably, the receiving element is, however, at least double-walled, more preferably it is composed of exactly two walls. The receiving element may, for example, be connected to the hose pipe by a bayonet fitting, it may, however, also be drawn over the hose pipe, for example as a single-walled hose portion, and may securely be fixed there, for example by a clamping strap. This likewise results in a double-walled structure of the receiving element. Between an exterior wall, provided with at least one aperture, and the closest situated interior wall, in the case of a double-walled design, i.e. the wall of the central pumping line, spacer means are preferably arranged in the receiving means. These spacer means may take the form of knobs, ribs, webs or the like and may serve to fix a cavity between the respective walls, so that sufficient liquid may be received in this region. The spacer means may in this context also be designed in such a manner that a type of reversed venturi nozzle effect is provoked, as a result of which the inflowing water is moved in the direction of the filling module through the central pumping line or the hose pipe towards the tank modules. In particular, synthetic materials, especially also rubber-like synthetic materials or rubber, possibly reinforced with carbon or glass fibers, may be used for the hose pipe or receiving means material—however, coilable carbon fiber hose pipes or light metal constructions may also be employed. Essentially, the hose pipe and also the receiving element, which may be manufactured from the same materials, must be sufficiently dimensionally stable to be able to absorb the pressures or other loads acting thereon, in particular tensile stress in the course of a filling process in flight. Depending on requirements, the hose pipe and/or the receiving means may present different cross-sections and/or diameters, so that, adapted for example to filling in flight, the air resistance is influenced, also by the selection of the material and the number of walls, so that the angle of immersion of the receiving element is modified and/or a directional stabilization is realized. By modifying the geometry of at least the exterior wall of the receiving element, the pressure distribution in the interior of the latter may be influenced, for example if the exterior wall has the shape of a truncated cone. This may ultimately achieve a higher degree of efficiency during the filling process.

Preferably, a mobile discharge device is arranged on the side of the bulkhead module facing the filling module. Depending on requirements, the latter may have differently dimensioned outlet apertures and inlet apertures corresponding to the collecting tank segment disposed in the bulkhead module. The provision of a very large outlet aperture, for example a rectangular one, presenting more or less identical dimensions to those of the collecting shaft, permits very fast discharge.

Accordingly, in the case of a high water column in the tank module, providing the largest possible cross-section, permits very fast and uniform discharge of the device according to the invention due to and the resultant high pressure. It is appreciated that gravity also aids in the discharge of water from the tank module.

The discharge device may, in particular, also include additional outlet valves, spray devices or the like, by means of which the release of liquid may be controlled. The discharge device may preferably serve simultaneously as a support and/or for alignment of the uncoiled hose pipe or the receiving element or may promote coiling of the latter. For this purpose, the discharge device preferably has a cross-section which corresponds to the cross-section of the collecting shaft of the tank modules and matches the corresponding collecting tank segment of the bulkhead module. In this case, on the side facing the bulkhead module, preferably an articulated joint, for example a bellows joint, may be provided, permitting to bend the discharge device away from the filling module arranged there above. Due to the described design of the discharge device, a large quantity of liquid may be released from the device according to the invention all at once and may be distributed uniformly in the course thereof over a region of great width. Moreover, the discharge device is preferably so designed that its overall depth is greater in the flow direction of the discharging liquid than the overall depth of the filling module arranged above the latter. The discharge device may then preferably support the uncoiling and coiling of the hose pipe or the receiving element fixed thereon. Guidance of the hose pipe or receiving element may in this context be further improved in that, on the side of the discharge device facing the filling module, guide elements are provided laterally, which may, in particular, also be V-shaped, bringing about a centering of the guidance of the hose pipe or the receiving element on the side of the discharge device facing the filling module.

Preferably, the tank modules comprise a vent system, situated in the upper apex region thereof, which, for example during transport, can be closed by means of a screw cap and be reopened during discharge. This permits pressure compensation especially during filling and discharging the device according to the invention. Apart from valves, control devices may also be provided in these vents, which, as a function of the pressure prevailing in the tank containers, regulate the air supply into the interior of the tank containers. The tank containers themselves are preferably designed in the form of anti-rolling tanks and may in this context be provided, in particular for stabilizing purposes, with fixing elements, in particular bulkheads, arranged in the interior thereof. These may be disposed in the longitudinal direction of the tank containers, but also normal thereto inside the said tank containers and may in this context, in particular, take the form of web and/or wall elements or bulkheads. During rolling or pitch movements of the aircraft, this damps the movement of the liquid received.

Figure 2:
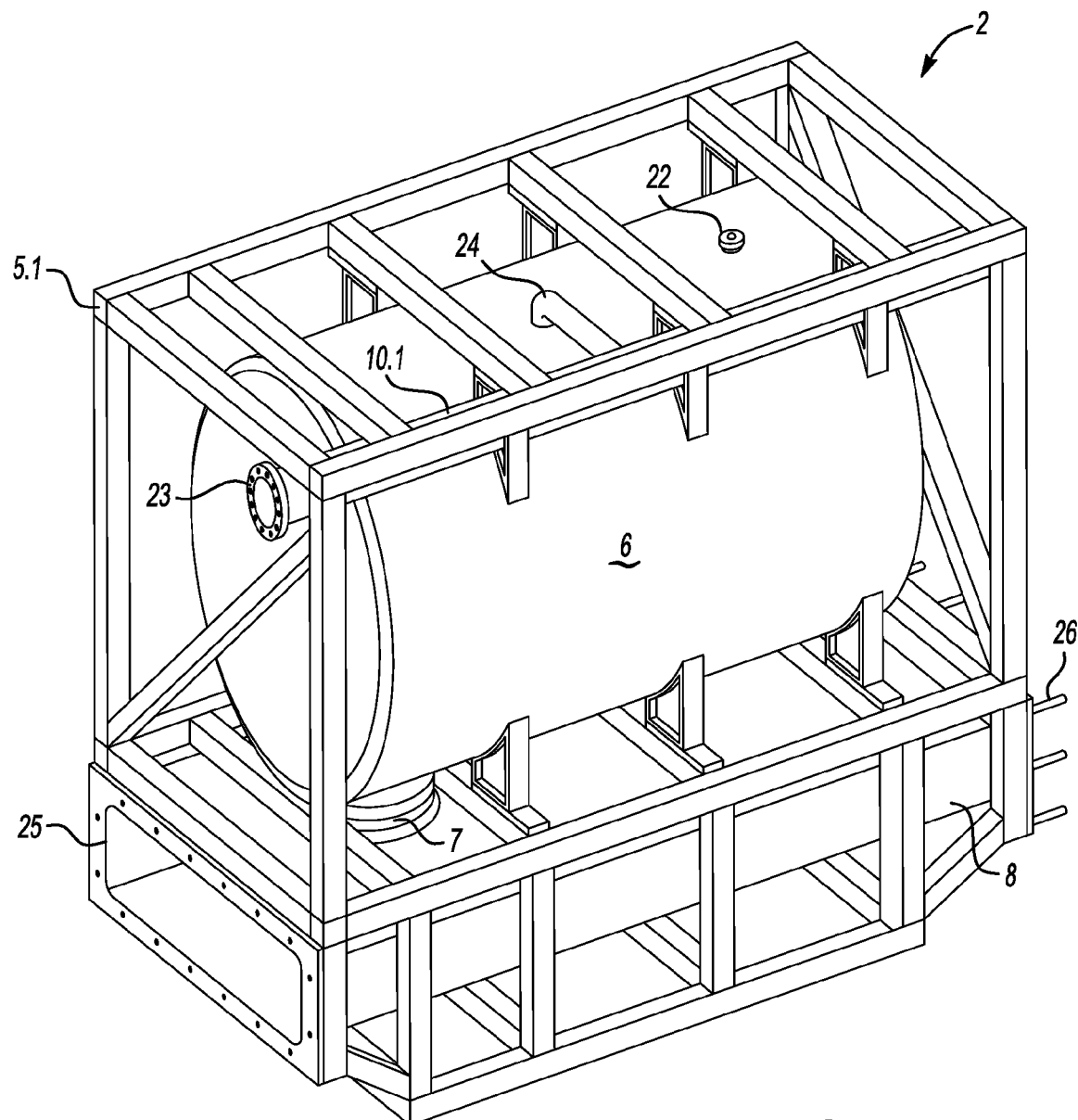
Figure 3:
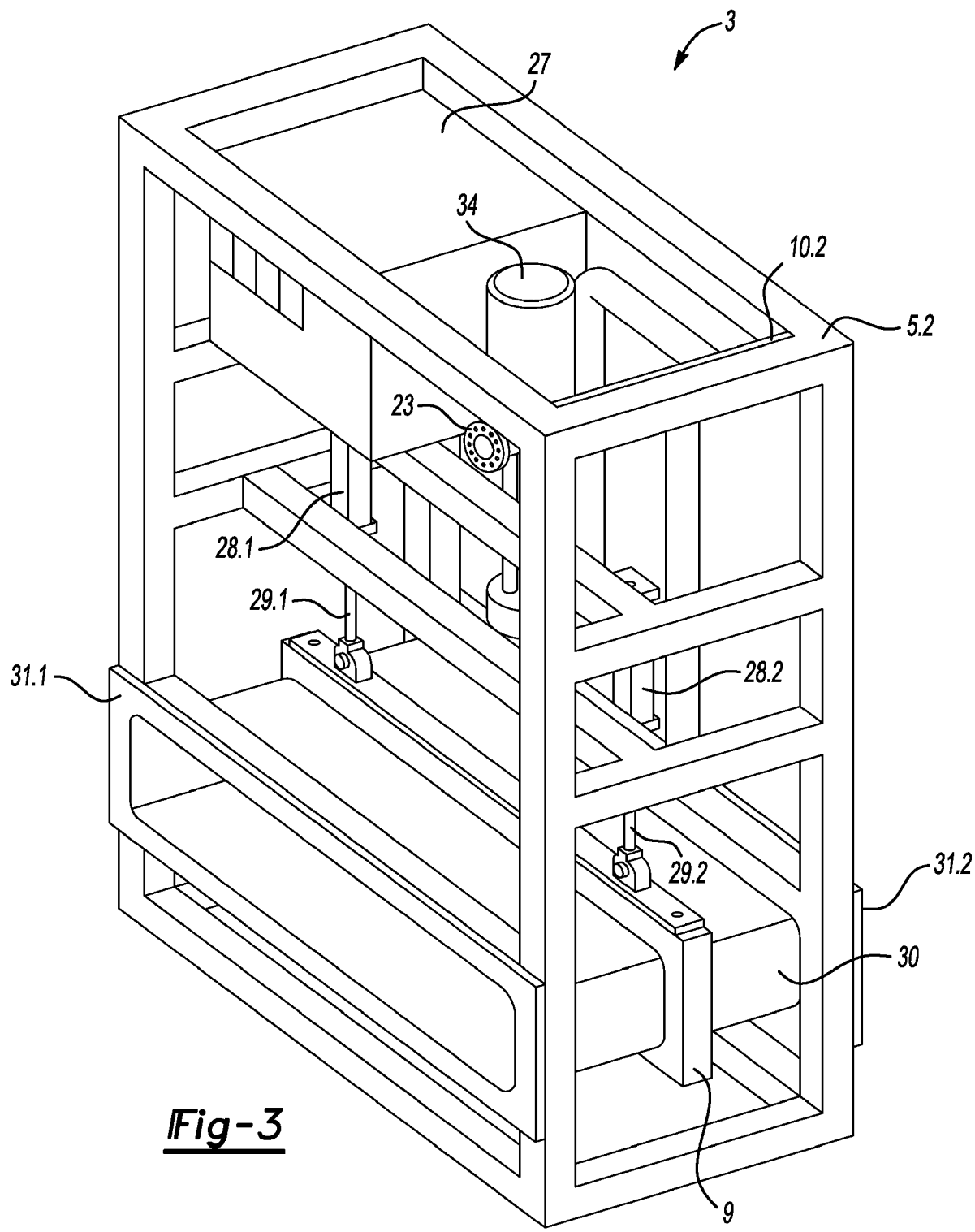

These and other advantages of the present invention are elucidated in more detail by way of the following figures, which represent examples of embodiments of the invention. There is shown in:

FIG. 1 a perspective, schematic view of the device according to the invention;

FIG. 2 a perspective view of the tank module;

FIG. 3 a perspective view of the bulkhead module;

FIG. 4 a perspective view of the filling module; and

Figure 6:
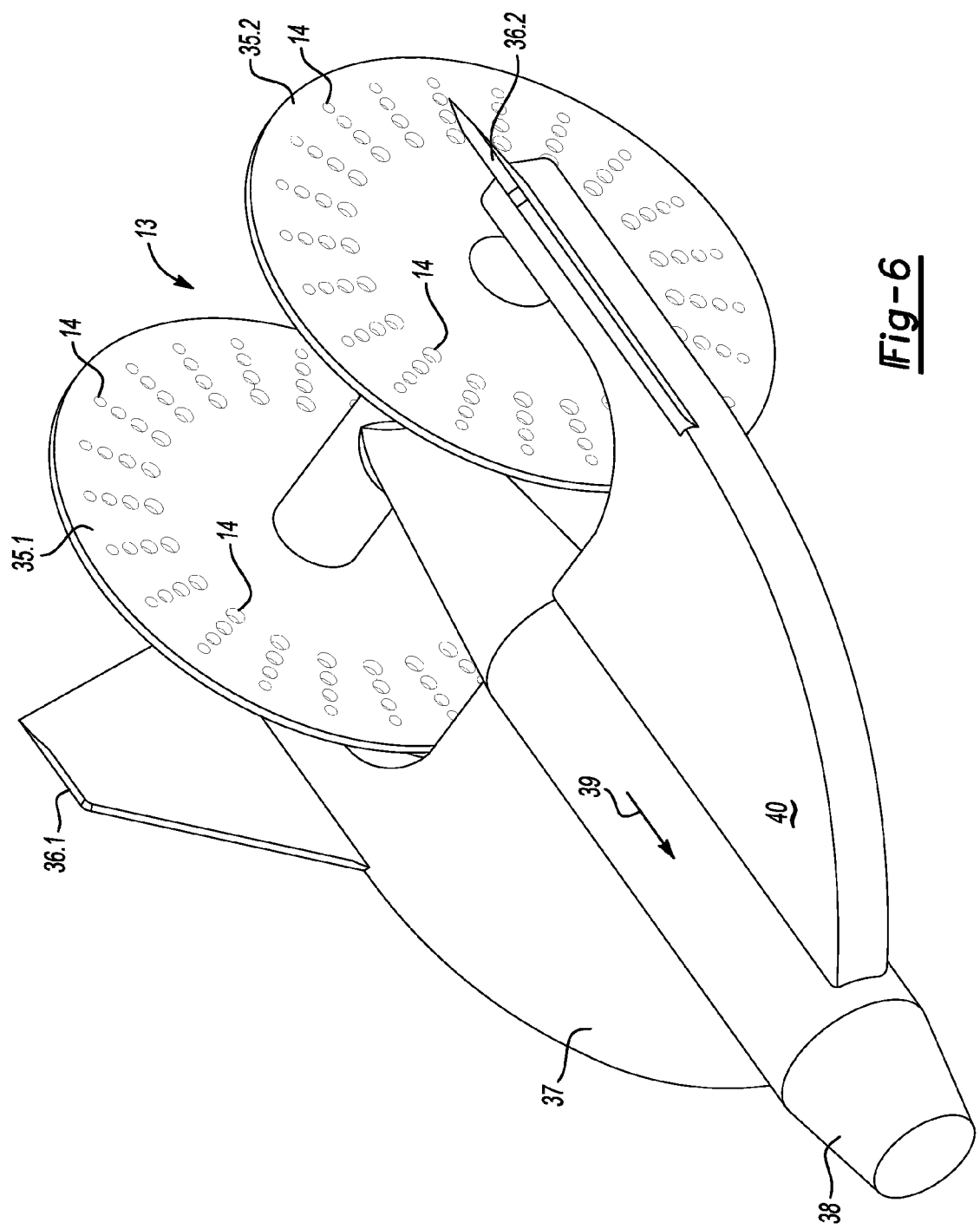

FIG. 5 a sectional view along section A-A of FIG. 4 of the receiving element;

FIG. 6 an alternative embodiment of the receiving element; and

FIG. 7 the embodiment according to FIG. 6 in a sectional view.

FIG. 1 shows a device according to the invention, denoted overall by the reference numeral 1, intended to receive liquids in an aircraft and to release liquids therefrom, in particular in flight. The latter comprises three tank modules 2 as well as a bulkhead module 3 and a filling module 4. The said modules are in this context interconnected by a feeding line 10.1, 10.2 and 10.3, through which liquids received by means of a receiving element 13 and a hose pipe 12 are transported to tank containers 6 of the tank modules 2 via feed ducts 24 arranged in the apex region of the tank containers 6.

The tank modules 2 comprise a collecting tank 8, which is in communication with the tank container 6 via a dome shaft 7. The tank container 6 may in this context be designed, in particular, in the form of an anti-rolling tank. The system consisting of the three tank modules 2 may be perceived as a system of communicating pipes. For example, it is thus also possible to provide a feed duct 24 only on the tank module 2 arranged closest to the bulkhead module 3, as the other tank containers 6 of the further tank modules 2 are likewise filled with liquid via the system of communicating pipes. In the connecting regions between the neighboring tank modules 2 themselves closing elements may optionally be provided, which engage in the collecting tank 8 and close the latter. Bulkhead modules 3 may also be arranged between the individual tank modules 2.

At the end of the device 1 according to the invention, facing away from the filling module 4, the collecting tank 8 in the last tank module 2 is sealed by a cover element, which may be fitted to the open flange of the collecting shaft 8 in order to prevent draining of the liquid from the device. Furthermore, apart from the three tank modules 2 of the device according to the invention shown in FIG. 1, further tank modules may be provided on either side of the latter, in which case the said further tank modules are then interconnected by connecting lines, not shown here, which may, for example, comprise ball valves, which are interconnected via collecting tanks 8 and/or tank containers 6, where applicable likewise adapted to be sealed. Depending on the type of aircraft, this allows a large-surface arrangement on the tank modules 2 taking into account the existing dimensions. Superposed stacking of the tank modules is likewise conceivable; however, in this case more complex connections of the respective collecting tanks 8 and/or tank containers 6 would then have to be provided.

The bulkhead module 3 comprises a closing element 9, which takes the form of a slider and which may be operated by a lifting cylinder. FIG. 1 shows the closing element 9 in the closing position. During opening of the latter the liquid inside the tank modules 2 may be discharged from the device 1 by means of a discharge device 20, the latter being connected via a shaft segment 30 of the bulkhead module 3, into the center of which the closing element engages.

Adjacent to the shaft module 3 a filling module 4 is shown, comprising a coiling device 11, functioning as a winch, on which coiling device a hose pipe 12 may be coiled up and uncoiled. At its end opposite the filling module 4, the hose pipe 12 carries a receiving element 13 serving to receive liquids, in particular also during flight. The liquid received is transported to the tank modules 2 via the feeding line 10.3 as well as via the further feeding line segments 10.2 and 10.1. The discharge device 20 is arranged underneath the filling module 4, extending beyond the filling module 4 in its longitudinal direction, so that during filling of the device 1 this provides support for the uncoiling and coiling of the hose pipe 12 from the coiling device 11 by means of the receiving element 13.

All modules 2, 3 and 4 are arranged in a tubular frame structure 5.1, 5.2 and 5.3, ensuring the best possible flexibility and a space-saving arrangement of the individual modules. In addition, this allows ensuring precise alignment of the individual modules in relation to one another.

FIG. 2 shows details of a single tank module 2. The latter comprises a tank container 6, which is connected to the collecting tank 8 via a dome shaft 7. At the one end, the collecting tank 8 includes a flange 25, which, in addition, includes incisions for receiving plug elements. At the end of the collecting tank 8 opposite to this flange 25 there is likewise provided a flange comprising corresponding plug elements 26, which engage into a flange 25 of an adjacent tank module 2 or, in the event that the tank module 2 is the last one in a row, may be provided with an appropriate closure cover. The connections of the other modules may be designed in this or a similar manner as well.

Inside the frame structure 5.1 the tank module 2 comprises the feeding line 10.1, which may be securely connected to adjacent tank modules or to a bulkhead module by flanges arranged at both ends of the said feeding line. Again, in the event of the tank modules 2 forming the last one in a row, the corresponding flange 23 may be sealed securely by a flange cover in order to reliably prevent leaking of the liquid to be received. By means of a feed duct 24, arranged in the apex region of the tank container 6, the liquid is transported to the tank container 6 through the feeding line 10.1. Pressure compensation is brought about by a vent 22, both in the course of filling as well as discharging processes of a liquid from the tank container 6. It is appreciated from FIGS. 1 and 2 that each tank module 2 can have its own collecting tank 8, feeding line 10.1, and feed duct 24. In addition, each tank module 2 can be releasably attached to an adjacent tank module 2 with a collecting tank 8 of one tank module 2 releasably attached to a collecting tank 8 of an adjacent tank module 2. Likewise, a feeding line 10.1 of one tank module 2 can be releasably attached to a feeding line 10.1 of an adjacent tank module 2.

FIG. 3 shows details of the bulkhead module 3, comprising a shaft segment 30, arranged in a tubular frame structure 5.2, into which shaft segment a closing element 9, namely a sliding element, engages. The closing element 9 is connected to lifting cylinders 28.1 and 28.2 via rod elements 29.1 and 29.2, which lifting cylinders are in turn connected to a drive means 27. When the drive means 27 is actuated, the closing element 9 may then be controlled between an opened and a closed position. FIG. 3 shows the bulkhead module 3 with the closing element 9 in the closed position. By means of the flanges 31.1 and 31.2 the bulkhead module 3 may be connected, on the one hand, to a discharge device 20 and, on the other, to tank modules 2. The bulkhead module 3 further includes a pumping device 34, which, acting as a suction pump, pumps liquid, received by means of the receiving element 13, into the tank modules.

FIG. 4 shows the filling module 4 with the coiling device 11, whereon a hose pipe 12 may be coiled and uncoiled. At its end opposite the coiling device 11, connected by means of a bayonet fitting 33, which is merely hinted at in the drawing, this hose pipe 12 comprises a receiving element 13, including a plurality of V-shaped incisions and apertures 14 formed thereby. At its end opposite the coiling device 11, the said receiving element comprises a closing means 32. A pumping device, not shown here, is provided in the interior of the coiling device 11. The filling module 4 has a tubular frame structure 5.3 as well. The liquid received via the receiving element 13 and the hose pipe 12 is ultimately fed via a feeding line 10.3 from the filling module 4 via a flange 23, not shown here in detail, via the bulkhead module 3, to the tank modules 2.

FIG. 5 shows a sectional view along section A-A of FIG. 4 of the receiving element 13. It can clearly be seen that a double-walled structure of the receiving element 13 is represented here comprising a central pumping line 18, including an interior wall 34 and an exterior wall 15, including a plurality of apertures 14. Between an exterior wall 15 of the receiving element 13 and the central pumping line 18 a region 17 is formed which is kept free in a defined manner by a plurality of spacer means 19, designed in this case as web segments, so that the liquid received in this region 17 via the apertures 14 can ultimately be fed to the device via the central pumping line 18.

The receiving element 13 of the embodiment shown in FIGS. 1 to 5 permits, in particular, filling of the device 1 in flight by means of an aircraft. In this case, after opening e.g. a charging hatch of the aircraft, the hose pipe 12 with the receiving element 13 is lowered down over the sea for example, by the coiling device 11 until the receiving element 13 is in contact with the water. In this context, at an assumed flying speed of approx. 200 km/h and a flying height of 15 to 20 m above the water surface, the hose pipe 12 and the receiving element 13 are configured in an optimized manner in relation to their weight and aerodynamics. The touch-down angle of the hose pipe onto water is in this context selected to be preferably in a range of about 35° to 60°, more preferably in a range of 40° to 50°. In this case, the receiving element 13 receives liquid, i.e. water via the at least one aperture 14, which is raised to face in the flying direction 16, indicated by an arrow in FIG. 1 and FIG. 4—i.e. regardless of whether the receiving element 13 is guided under water or comes to rest on the water surface or is impacting thereon.

The water thus flows through the at least one aperture 14 into the region 17 between an exterior wall 15 and the central pumping line 18 with the interior wall 34. In the head region the receiving element 13 is so designed that it is closed, on the one hand, by means of the closing means 32, and, on the other hand, the central pumping line 18 terminates inside the receiving element 13 in a clearly spaced-apart relationship to the closing element 32, so that the liquid located in the region 17 of the receiving element 13 collects in the head region of the receiving element 13 and can be fed to the device 1 through the central pumping line 18. The central pumping line 18 is thus shorter than the exterior wall 15 of the receiving element 13.

The water sucked in by a suction pump device, arranged in the filling module 4 inside the coiling device 11, is passed via the feeding lines 10.3 and 10.2 and, finally, 10.1 into the individual tank containers 6 of the tank modules 2 via the feed ducts 24. The latter are filled uniformly as a result of the system of communicating pipes thus formed. Due to air flowing out during the filling procedure or, respectively, due to air flowing in during a discharging procedure of the device 1, pressure compensation is brought about via the vents 22, which are, in particular, designed as valves and are furthermore configured to be controlled as a function of the pressure, determined in a sensory manner in the interior of the tank containers 6. By means of filling level indicators, not shown in detail, provided on the tank containers 6 of the tank modules 2, it can be established whether the tank modules 2 are fully charged—even automatically—, whereupon the pumping process is terminated and the hose pipe 12, together with the receiving element 13, is subsequently coiled onto the coiling device 11 by the latter.

Having received the liquid, in particular water, the latter is subsequently moved to the target area by the aircraft, the closing element 9 being opened via the drive means 27 after opening the loading hatch and, optionally, fitting a discharge device 20 of appropriate length, adapted to the application, to the bulkhead module 3 by means of flanges, so that the liquid received may be withdrawn from the device 1 via the discharge device 20 and may be released over the target area.

Of course, it is also possible for the device 1 to receive liquid by filling on the ground, in which case a simple hose section may then be provided to serve as the receiving element 13. The pumping device may then alternatively be arranged at the end of the receiving means 13, opposite the hose pipe 12.

If the intention is to perform fire extinction by employing spray mist, for example, an appropriate outlet head may be fitted to the discharge device 20. In addition, additives, for example fire extinguishing additives, pesticides, fertilizers etc., depending on requirements and application, may be added to the liquid via the vents 22 or via additional feeding apertures in the individual containers.

FIGS. 6 and 7 show an alternative embodiment of the receiving element 13. The receiving element 13, in this case, comprises two rotation bodies 35.1 and 35.2, configured as double-walled disks, comprising a plurality of apertures 14. The rotation bodies 35.1 and 35.2 are supported on a base body 37, at the longitudinal sides of which fin-like elements 36.1 and 36.2 are provided for stabilizing purposes. The receiving element 13 can be connected to a hose pipe 12 (not shown here) by a coupling member 38. Liquid is received through the plurality of apertures 14 in the rotation bodies 35.1 and 35.2 and transported via the connecting member 39 towards the filling module through the hose pipe 12, not shown here. In this context, the receiving element shown in FIG. 6 may additionally include its own drive means, which may be synchronized with the speed of the aircraft. The two rotation bodies 35.1 and 35.2 may in this case likewise be actively driven.

The drive means of the receiving element, preferably in synchronization with the speed of the aircraft, offers the advantage that this allows to overcome the resistance of the water, or, respectively, that the receiving element 13 may be guided in a stabilized manner in or on the liquid, in particular water, and that liquid may be received by the latter.

FIG. 7 shows the alternative embodiment of the receiving element 13 shown in FIG. 6, wherein the disk wheel 35.2 is shown in a sectional view. It can clearly be seen here that the apertures 14, extending radially, are interconnected by grooves 41 located on the inside. This configuration of the inner surface of the disk wheels 35.2 permits effective conveyance of large amounts of liquid into the device 1, in particular also when an active drive means is provided for the said disk wheels.

The present invention thus provides a highly flexible device, by means of which liquids may be received and released again rapidly, both on the ground as well as in flight.

The invention claimed is:

1. A modular aircraft liquid transferring system for receiving liquids in an aircraft and/or releasing liquids therefrom, said modular aircraft liquid transferring system comprising:
   at least two tank modules releasably attached to each other to form an array of tank modules, each tank module having at least one tank container, at least one collecting tank connectable to and in fluid communication with said at least one tank container via at least one connecting shaft, and a feeding line, wherein said at least one collecting tank of each tank module are releasably attached to each other, said collecting tank is arranged under said tank containers and said tank containers of said at least two tank modules are interconnected via said at least one collecting tank of each tank module and at least one feeding line;
   a bulkhead module connectable to one of said at least two tank modules via said collecting tank of said tank module connectable to said bulkhead module, said bulkhead module having a closing element by means of which, in the open position, liquids are released from said tank module; and
   a filling module connectable to said at least two tank modules via said at least one feeding line, and a hose pipe which is arranged on a coiling device comprising a receiving element defining at least one aperture for receiving and releasing liquids from the aircraft.

2. The aircraft liquid transferring system according to claim 1, wherein said receiving element is at least double-walled.

3. The aircraft liquid transferring system according to claim 2, wherein said aperture is defined in an exterior wall of said receiving element and is an incision, said incision is raised for said aperture to face in the direction of flight of the aircraft.

4. The aircraft liquid transferring system according to claim 3 further comprising a pumping device, by means of which the liquid received in a region between said exterior wall and an at least one further interior wall of said receiving element is pumped into said tank module via a central internal line of said receiving element and said hose pipe, said central internal line forming said interior wall of said receiving element.

5. The aircraft liquid transferring system according to claim 4, wherein said receiving element comprises a spacer means provided between said central internal line and said exterior wall, provided with said apertures.

6. The aircraft liquid transferring system according to claim 1, wherein said receiving element comprises at least one fin for stabilizing purposes.

7. The aircraft liquid transferring system according to claim 1, wherein said receiving element comprises weights for weighting the latter.

8. The aircraft liquid transferring system according to claim 1 further comprising a mobile discharge device attachable to the side of said bulkhead module facing said filling module.

9. The aircraft liquid transferring system according to claim 8, wherein said discharge device serves as a support and for the alignment of said hose pipe, and said receiving element respectively.

10. The aircraft liquid transferring system according to claim 1, wherein said tank module, bulkhead module and filling module are designed as a tubular frame structure.

11. The aircraft liquid transferring system according to claim 1, wherein said tank module includes at least one vent.

12. The aircraft liquid transferring system according to claim 1 further comprising at least one additional tank module including at least one tank container, and at least one collecting tank connectable to said tank container via at least one connecting shaft, wherein said additional tank module being connectable to said tank module downstream of said bulkhead module thereby creating an adjustable array of tank modules.

13. The aircraft liquid transferring system according to claim 1, wherein said tank module includes at least one vent located in an upper apex region thereof, said vent comprises a control device for regulating air into and out of the interior of said tank container as a function of the pressure prevailing in said tank container.

14. The aircraft liquid transferring system according to claim 1, wherein said feeding line of each tank module are releasably attached to each other.

15. An aircraft liquid transferring system comprising:
at least two tank modules releasably attached to each other to form an array of tank modules, each tank module having at least one tank container, at least one collecting tank connectable to and in fluid communication with said at least one tank container via at least one connecting shaft and a feeding line, wherein said at least one collecting tank of each tank module are releasably attached to each other, said collecting tank is arranged under said tank containers and said tank containers of said at least two tank modules are interconnected via said at least one collecting tank of each tank module and at least one feeding line;
a bulkhead module connectable to one of said at least two tank modules via said collecting tank of said tank module connectable to said bulkhead module, said bulkhead module having a closing element by means of which, in the open position, liquids are released from said tank module;
a filling module connectable to said at least two tank modules via said at least one feeding line, and a hose pipe which is arranged on a coiling device comprising a receiving element defining at least one aperture for receiving and releasing liquids from the aircraft, said receiving element being at least double-walled and having an exterior wall; and
a mobile discharge device attachable to the side of said bulkhead module facing said filling module, said discharge device being adapted to support and align of said hose pipe and said receiving element respectively;
wherein said aperture is defined in said exterior wall of said receiving element and is a V-shaped incision, said V-shaped incision is raised for said aperture to face in the direction of flight of the aircraft.

16. The aircraft liquid transferring system according to claim 15 further comprising a pumping device, by means of which the liquid received in a region between said exterior wall and an at least one further interior wall of said receiving element is pumped into said tank module via a central internal line of said receiving element and said hose pipe, said central internal line forming said interior wall of said receiving element.

17. The aircraft liquid transferring system according to claim 15, wherein said receiving element comprises a spacer means provided between said central internal line and said exterior wall, provided with said apertures.

18. The aircraft liquid transferring system according to claim 15, wherein said receiving element comprises at least one fin for stabilizing purposes and weights.

19. The aircraft liquid transferring system according to claim 15, wherein said tank module, bulkhead module and filling module are designed as a tubular frame structure.

20. The aircraft liquid transferring system according to claim 15, wherein said feeding line of each tank module are releasably attached to each other.

21. A modular aircraft liquid transferring system comprising:
at least two tank modules releasably attached to each other to form an array of tank modules, each tank module having at least one tank container, at least one collecting tank connectable to and in fluid communication with said at least one tank container via at least one connecting shaft and a feeding line, wherein said at least one collecting tank of each tank module are releasably attached to each other, said collecting tank is arranged under said tank containers and said tank containers of said at least two tank modules are interconnected via said at least one collecting tank of each tank module and at least one feeding line;
a bulkhead module connectable to one of said at least two tank modules via said collecting tank of said tank module connectable to said bulkhead module, said bulkhead module having a closing element by means of which, in the open position, liquids are released from said tank module;
a filling module connectable to said at least two tank modules via said at least one feeding line, and a hose pipe which is arranged on a coiling device comprising a receiving element defining at least one aperture for receiving and releasing liquids from the aircraft, said receiving element being at least double-walled and having an exterior wall and an interior wall;
a pumping device, by means of which the liquid received in a region between said exterior wall and said interior wall of said receiving element is pumped into said tank module via a central internal line of said receiving element and said hose pipe, said central internal line forming said interior wall of said receiving element; and
a mobile discharge device attachable to the side of said bulkhead module facing said filling module, said discharge device being adapted to support and align of said hose pipe and said receiving element respectively;
wherein said aperture is defined in said exterior wall of said receiving element and is a V-shaped incision, said V-shaped incision is raised for said aperture to face in the direction of flight of the aircraft.

* * * * *